United States Patent [19]

Gagne et al.

[11] Patent Number: 5,486,085
[45] Date of Patent: Jan. 23, 1996

[54] BLADED VEHICLE WITH LOAD GRIPPING ARMS

[76] Inventors: Daniel C. Gagne, Box 996, Invermeere, British Columbia, Canada, V0A 1K0; Arie A. Pronk, Box 310, Fairmont Hotsprings, British Columbia, Canada, W0B 1L0

[21] Appl. No.: 84,585

[22] Filed: Jul. 1, 1993

[30] Foreign Application Priority Data

Sep. 21, 1992 [CA] Canada .................................... 2078750

[51] Int. Cl.⁶ ...................................................... B66C 3/00
[52] U.S. Cl. ............................ 414/724; 37/407; 37/903; 294/104; 414/740; 414/912
[58] Field of Search ....................... 414/729, 722, 414/724, 912, 740; 37/903, 381, 403, 406, 407; 294/104; 172/811

[56] References Cited

U.S. PATENT DOCUMENTS 4,723,609  2/1988  Curtis ..................... 414/724 X
4,781,518  11/1988  Paavila ..................... 414/912 X

FOREIGN PATENT DOCUMENTS 1169819  6/1984  Canada ..................... 414/724
1154410  5/1985  U.S.S.R. ..................... 414/724
1352005  11/1987  U.S.S.R. ..................... 414/912

*Primary Examiner*—Donald W. Underwood
*Attorney, Agent, or Firm*—Stoll, Miskin, Previto & Hoffman

[57] ABSTRACT

A vehicle having an earth moving blade equipped with log gripping devices at the ends thereof. The log gripping devices consist of a mounting assembly which is attached to the rear of the earth moving blade. Mounted on the assembly is an arm which in its retracted position is located behind and within the area between the ends of the blade. Hydraulic pistons and cylinders move the arms outwardly of the ends of the blade independently to permit the arms to grip logs and felled trees between the arms and the ends of the blade.

13 Claims, 4 Drawing Sheets

5,486,085

BLADED VEHICLE WITH LOAD GRIPPING ARMS

FIELD OF INVENTION

This invention relates to a gripping device for use with vehicle mounted earth moving blades.

BACKGROUND OF THE INVENTION

It is useful to be able to use vehicles such as bulldozers with earth moving blades for hauling logs and felled trees through bush area while being able to protect the log gripping device against damage when the blade is being used for movement of earth. It is also desirable for environmental reasons that such vehicles be capable of being used without equipment projecting beyond the ends of the blade.

U.S. Pat. No. 4,645,410 to Royer discloses a device which is attached to the earth moving blade of a vehicle for use in hauling felled trees and logs. This device is attached to an end of the blade and permanently extends beyond the end of the blade. As a result the device is subject to damage when using the blade in a normal manner unless the device is first dismounted.

U.S. Pat. No. 4,781,518 to Paavila discloses a tree gripping device which is mounted on a bulldozer blade and permanently projects beyond the edge of the blade. Accordingly, this device is also subject to damage when using the bulldozer blade in the normal manner, unless the device is first dismounted.

The Royer and Paavila devices would also tend to cause environmental damage during use of the vehicle with the gripping devices not in use, by reason of the fact that the devices permanently project beyond the ends of the blades.

SUMMARY OF THE INVENTION

It is the purpose of the present invention to provide a felled tree and log gripping device for mounting on the back of a bulldozer blade, in which the mounting assembly is positioned fully within the area between the two ends of the blade and the load gripping arm when in its retracted position, is also positioned within the area between two ends of the blade.

It is a further purpose of the present invention to provide a load gripping device for mounting on the back of a bulldozer blade in which the load gripping arm is curved and forms a gripping jaw with an end edge of the bulldozer blade by a scissor-like action with the edge of the blade, to permit the gripping area to be reduced to as small an area as desired.

It is a further purpose of the invention to provide a load gripping device comprising a pivotal arm operated by a hydraulic piston and cylinder wherein the relative positioning of the pivot point of the arm and the point of attachment of the piston and cylinder combination, permits the end of the arm to be raised to a relatively high level in order to reach logs in elevated locations.

It is a further purpose of the present invention to provide a load gripping device for mounting on the ends of earth moving blades which has a mounting assembly adapted to resist torsional stresses.

In accordance with the present invention there is provided a tool for mounting on an earth moving blade of a vehicle comprising: a tool member adapted to move between a fully extended and a fully retracted position, wherein the tool member is situated behind and within the area between the ends of the bulldozer blade, when in the fully retracted position.

In accordance with the present invention there is also provided a gripping device for mounting on an earth moving blade of a vehicle comprising: a load engaging element adapted to move between a fully open and a fully closed position, whereby when in the fully closed position, the load engaging element is situated behind the blade and in an area between the ends of the blade.

In accordance with the present invention there is further provided a vehicle blade having a front working surface and a rear surface, a pivotable element having a curved edge mounted on the back of the blade, the element being movable between a closed position and an open position, wherein the element is situated behind and within the area between the ends of the blade when the element is in the closed position.

In accordance with the present invention there is yet further provided a vehicle having an earth working blade with load gripping means thereon, comprising: a load engaging element mounted on the back of the blade, the load engaging element being movable between a fully open position and a fully closed position, wherein the element is situated behind and within the area between the ends of the blade, when in the fully closed position.

In accordance with the present invention there is yet further provided a vehicle having an earth working blade with load gripping means thereon, comprising: the blade being substantially rectangular and having a front working surface and a back surface and first and second ends, a load engaging element, mounting means pivotally connecting the load engaging element to the back surface of the blade adjacent the first edge thereof, the load engaging element having a curved edge, the load engaging element being adapted to pivot in a plane parallel to the plane of the back surface of the blade, the curved edge of the load engaging element being adapted to co-operate with the first edge of the blade to form a pair of load gripping jaws therebetween.

DESCRIPTION OF THE PREFERRED EMBODIMENTS

Figure 1:
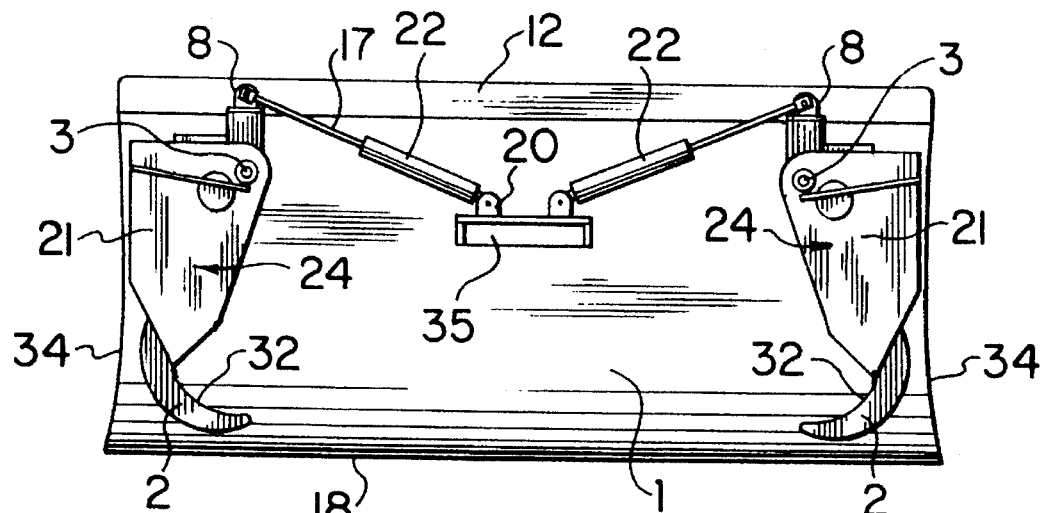
FIG. 1 is a rear view of an earth moving blade mounted with a pair of gripping devices in accordance with the present invention.

Referring to FIG. 1 there is shown a rear view of an earth moving blade on which is mounted a pair of gripping devices in accordance with the present invention. The gripping devices comprise a mounting assembly indicated generally as 24 and gripping arms indicated generally as 32. It will be understood that the gripping devices mounted on opposite ends of the blade 1 are mirror images of one another.

Figure 3:
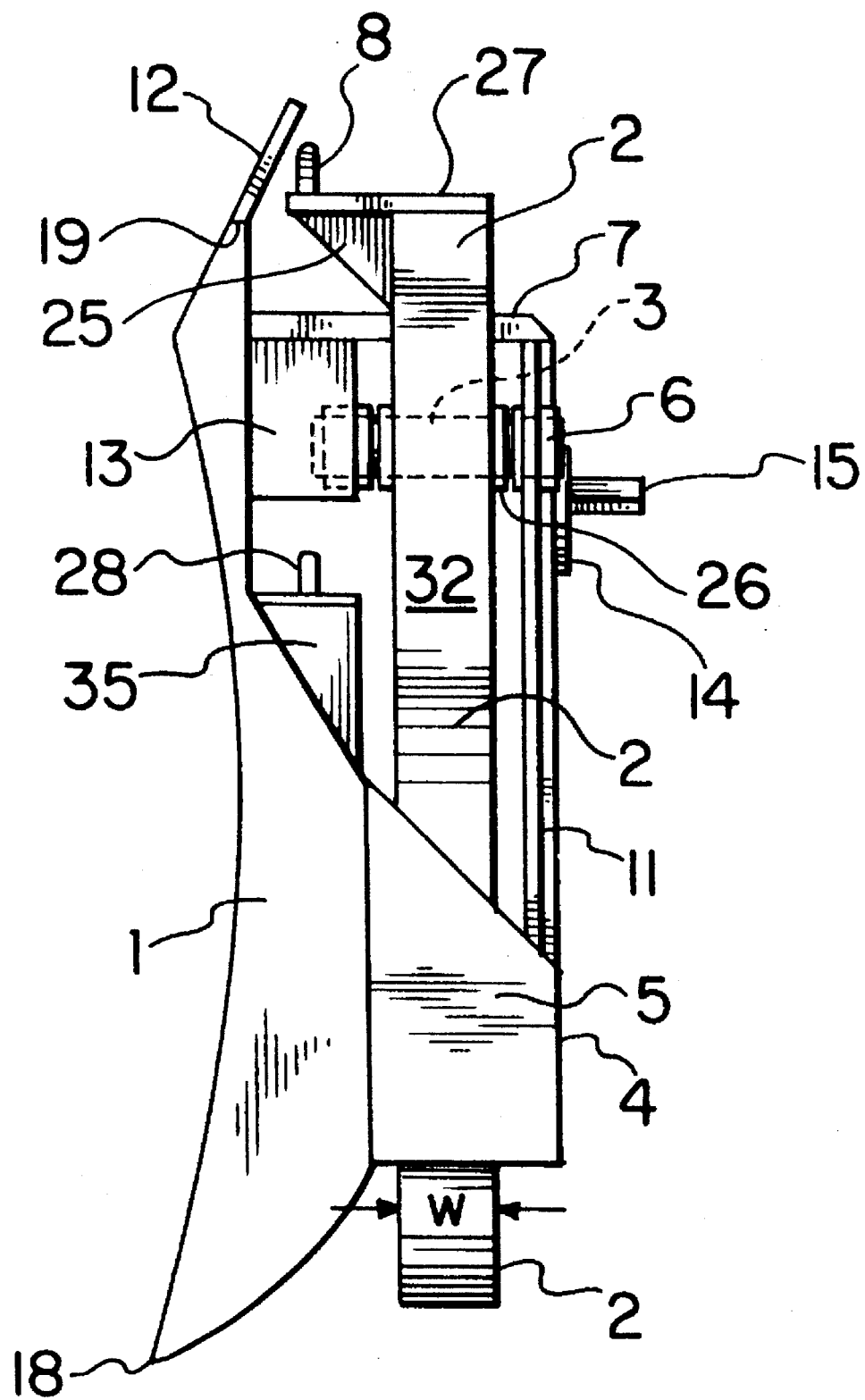
FIG. 3 is a side view of the gripping device shown in FIG. 2.
Figure 7:
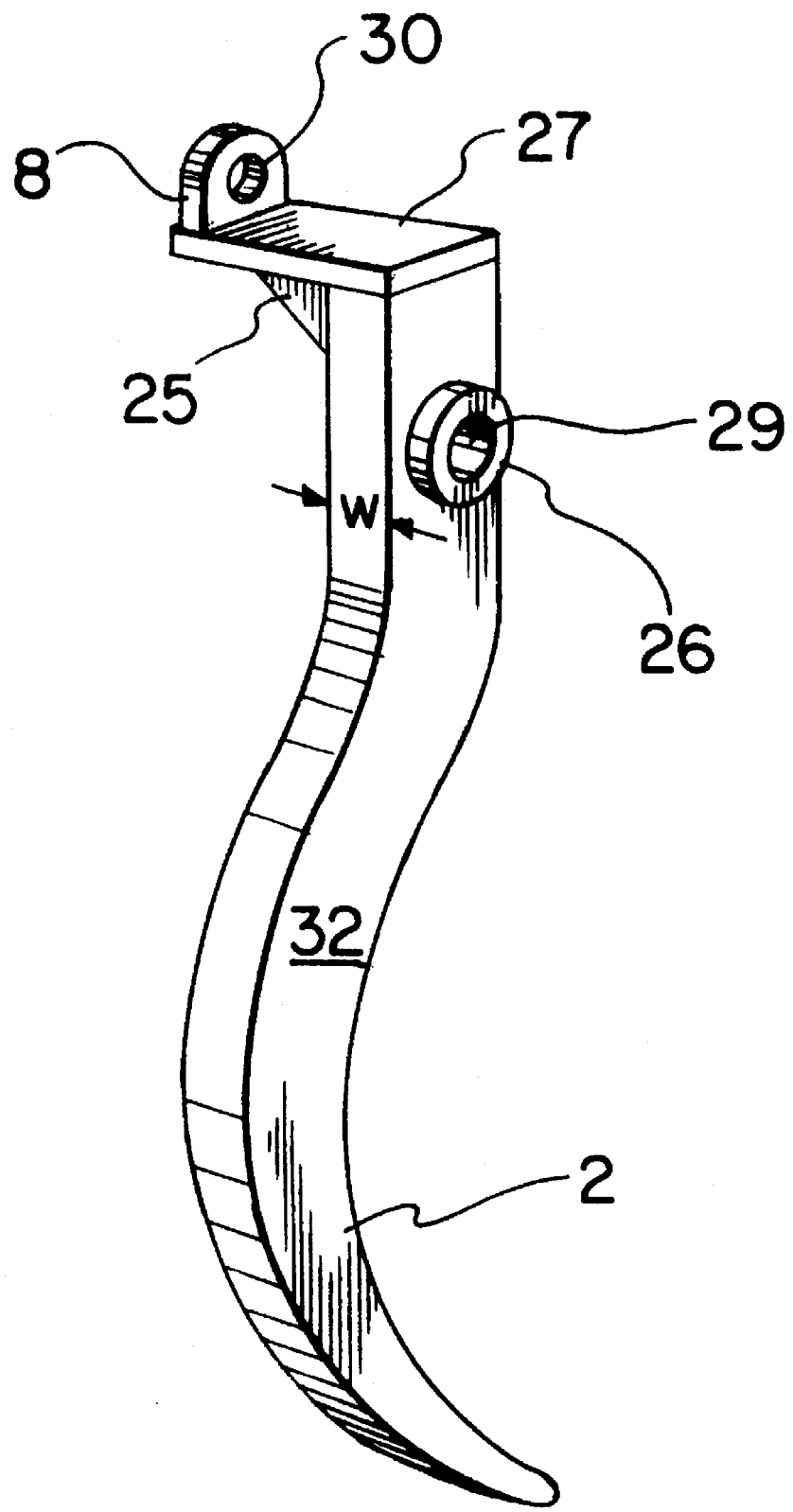
FIG. 7 is a perspective view of the gripping arm.

Referring to FIG. 7 which shows a perspective view of the load gripping arm indicated generally as 32, the arm comprises a curved load engaging portion 2 which is tapered in the plane of its curvature. As shown in FIG. 3 the arm is of generally constant width W.

At the end of the arm 32 remote from the load engaging portion 2, a plate 27 extends laterally. The plate 27 has a perpendicular flange 8 at the end thereof and is supported by bracket 25. The main portion of the arm 32, the top blade 27, the supporting bracket 25 and the flange are welded together to form the unitary arm 32.

Figure 2:
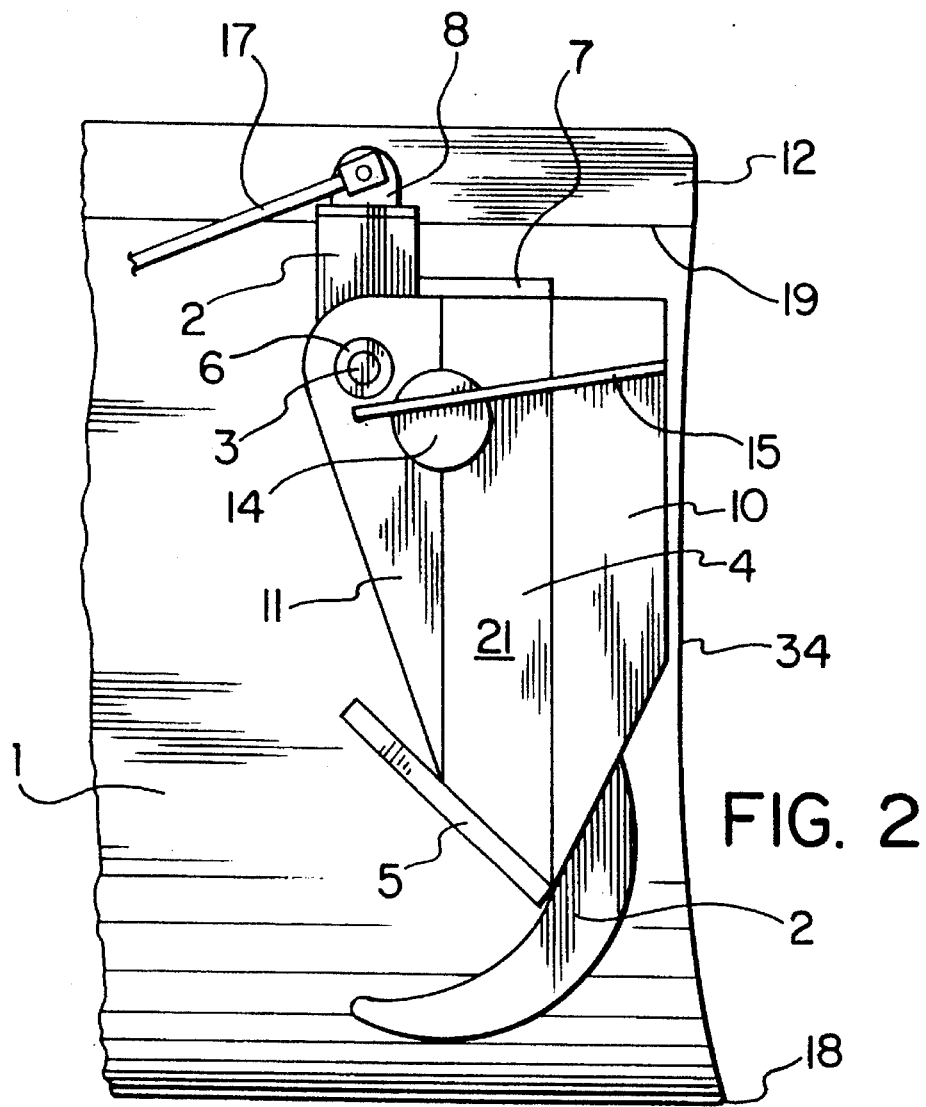
FIG. 2 is a more detailed and enlarged view of the right hand side gripping device shown in FIG. 1.

The flange 8 is adapted to be connected to the end of piston rod 17 as indicated in FIG. 2. Adjacent the end of the arm 32 bearing the plate 27 a bore 29 having bushings 26 see FIG. 7 at each end thereof, is adapted to receive pivot pin 3 (FIG. 7).

As shown in FIG. 1 the gripping arm 32 is mounted on the back of the blade 1 by means of a mounting assembly generally designated as 24.

The mounting assembly 24 includes a mounting box 13 see FIG. 3 having an opening therein mounted with bushings for receiving pin 3. The mounting box 13 is welded to the back of the blade 1 as shown in FIG. 3.

The mounting assembly 24 further includes a side plate 21 see FIG. 2 which is attached to the back of the blade 1 by top support plate 7 and lower support plate 5. Support plates 5 and 7 are welded to the side plate 21 and to the back of the blade 1 to form a rigid supporting structure for the gripping arm 32.

The side plate 21 may be composed of segments 11, 10 and 4 which are welded together as shown in FIG. 2, or may consist of a single plate. In order to provide additional resistance to torsional stresses, a circular stress plate 14 and a supporting bridge 15 may be welded to the side plate 21. A bushing 6 is positioned within an opening in side plate 21 to provide an aperture for the pin 3 in alignment with the aperture of the bushing in the mounting box 13.

As shown in FIG. 3, the arm 32 is mounted on pin 3 between the mounting box 13 and the side plate 21 3 so as to permit pivotal movement of the arm 32 relative to the mounting assembly 24.

As shown in FIG. 3, a piston and cylinder mounting box 35 having a projection 28 on the top thereof is welded to the rear surface of the blade 1. Piston and cylinder unit 20 (not shown in FIG. 3) is pivotally attached at one end thereof, to the projection 28 and is connected via of piston arm 17, to projection 8 on the gripping arm 32. As will be seen from FIG. 3, the point of connection 28 of the piston and cylinder to the back of the blade is below its point of connection 8 to the arm 32. This permits the end of the arm 32 to be raised to a relatively high position which presents an advantage in retrieving logs which are located in a raised position.

In order to protect the device particularly the piston and cylinder 20, from damage during usage of the blade 1, a top guard 12 consisting of an elongated metal section of steel plate may be welded to the top 19 of the blade 1.

As will be seen from FIG. 1, the mounting assembly is situated entirely within the area between the edges 34 of the blade 1. Moreover as will also been from FIG. 1, when the gripping arms 32 are in their retracted positions they are also situated entirely within the area between the ends 34 of the blade 1. In stating herein that the device is located within the area between the ends of the blade what is meant is that the device does not project laterally beyond the ends of the blade, or vertical projections of the ends of the blade.

Arms and mounting assemblies which are mirror images of one another may be mounted on each end of the bulldozer blade as shown in FIGS. 1, 4, 5 and 6. The piston and cylinder devices 20 are equipped with a hydraulic pressure source and with controls (not shown) to provide independent operation of each gripping device by the vehicle operator.

Figure 4:
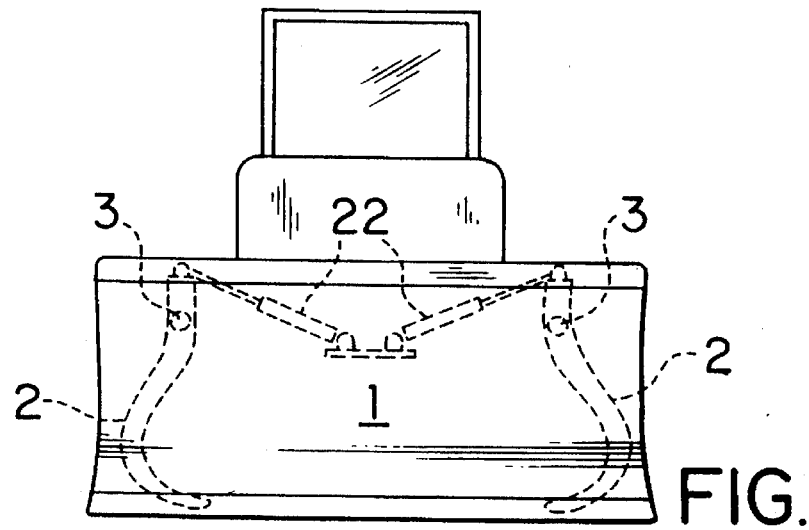
FIG. 4 is a front view of a bulldozer equipped with gripping devices in accordance with the present invention, with the load engaging elements in their retracted positions.
Figure 5:
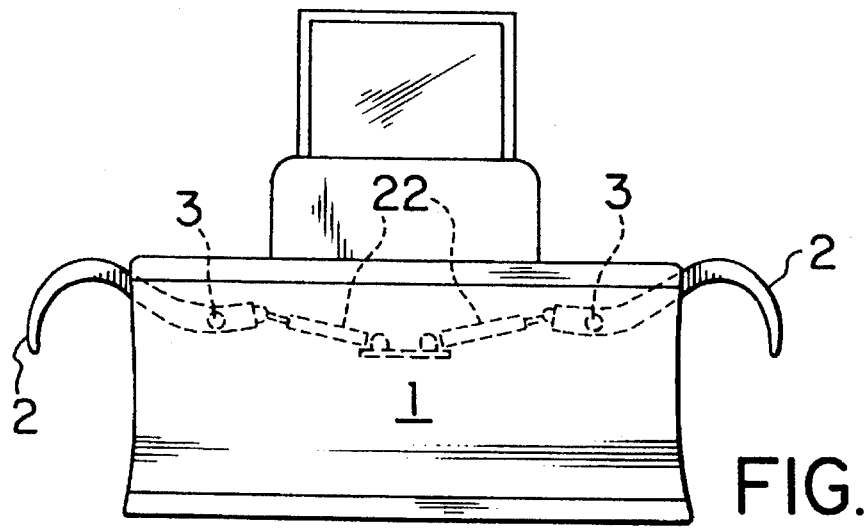
FIG. 5 illustrates the bulldozer shown in FIG. 4 with the load engaging elements in their extended positions.

In operation, by use of the hydraulic controls, the operator moves one or both of the arms 32 from the retracted position shown in FIG. 4 to an appropriate extended position such as shown in FIG. 5. The edge 34 of the blade 1 is positioned adjacent the felled tree or log and the operator causes the arm 32 to retract until the felled tree or log is suitably gripped between the arm 32 and the edge 34 of the blade.

The curved shape of the arm 32 permits the arm to scoop up logs from the ground and causes the logs to move upwardly in contact with the edge of the bulldozer blade, as the arm 32 is closed.

Figure 6:
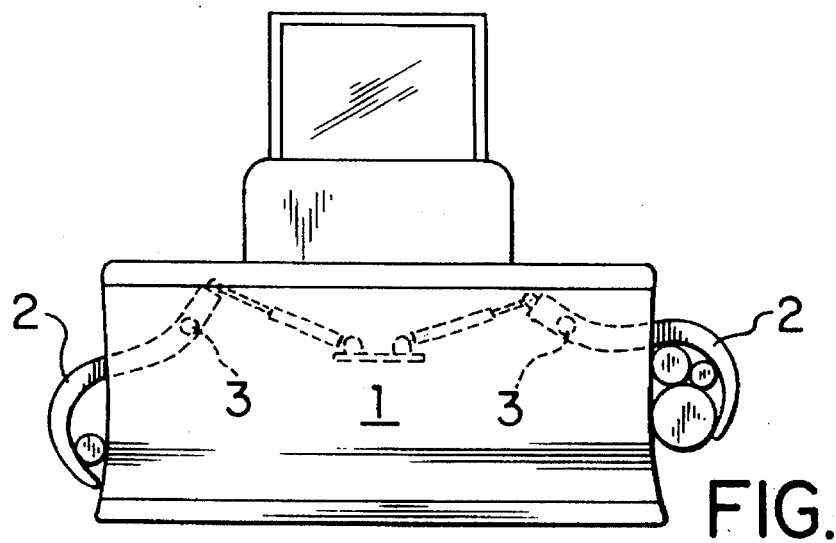
FIG. 6 illustrates the bulldozer shown in FIG. 4 with the load engaging elements gripping tree trunks.

As will been seen from FIG. 6, since the arm 32 can close entirely behind the edge of the blade 34 it is able to handle logs of very small size, as well as large logs.

Because of the distance of the point of pivot of the arm 32 above the point of connection of the piston and cylinder unit, 20 to the blade 1, the end of the arm is able to open to be raised to a relatively high level permitting it to be used to grasp logs on hill sides or on piles.

If the operator wishes to use the bulldozer blade for earth moving purposes he merely retracts the arms to the positions shown in FIG. 4 so that they are behind the bulldozer blade and within the area between the ends of the blade. This protects the arms from damage such as might occur if they were to strike a rock during earth moving operations. Moreover with the arms in their retracted positions, the vehicle is able to move through the bush without added lateral bulk thus avoiding unnecessary damage to the environment.

A further advantage of the device is that due to the scissor-like action of the arms with the back of the blade, the device may be used to snip off unwanted ends of felled trees.

The embodiments of the invention in which an exclusive property of privilege is claimed are defined as follows:

1. A vehicle having an earth working blade with load gripping means thereon,
    said blade being substantially rectangular and having a front working surface, a back surface and first and second side edges, said load gripping means including an arm having a curved load engaging portion,
    mounting means pivotally connecting said arm to said back surface of said blade adjacent said first edge thereof,
    hydraulic means connecting said arm and said blade for providing movement to said arm relative to said blade,
    said arm being adapted to move in a plane parallel to and adjacent to said back surface of said blade,
    said curved portion of said arm being adapted to co-act with said first edge of said blade to form a pair of load gripping jaws therebetween and
    wherein said load engaging portion of said arm is positionable in an area adjacent said back surface of said blade and between said ends of said blade.

2. A vehicle in accordance with claim 1, wherein movement of said arm by said hydraulic means is controlled by the operator of the vehicle.

3. A vehicle in accordance with claim 1 wherein said load engaging portion of said arm co-acts with said first edge of said blade in a scissor-like action.

4. In combination a vehicle working blade and a working arm, said blade having a perimeter defined by a top edge, a bottom edge and first and second side edges thereof, said blade including a rear surface, at least a portion of said rear surface adjacent said first side edge being situated generally in a first plane, said working arm including a concave load contacting portion, said concave load contacting portion of said arm being positionable outside said perimeter of said blade to serve as an element of a load gripping jaw, connecting means pivotally connecting said arm to said blade, hydraulic means connecting said arm and said blade for providing movement to said arm relative to said blade, said arm being movable along a path which is parallel to said first plane and which in part is situated alongside said rear surface, said concave load contacting portion of said arm being positionable inside said perimeter of said blade in juxtaposition to said rear surface.

5. The combination defined in claim 4 wherein said concave load contacting portion of said arm co-acts with said first side edge of said blade to form a load gripping jaw.

6. The combination defined in claim 4 wherein said arm is pivotable about an axis which is perpendicular to said first plane and said axis is situated within said perimeter of said blade.

7. The combination as defined in claim 6 wherein said connecting means comprises arm mounting means attached to said rear surface of said blade, said mounting means including a backing plate, means joining said backing plate to said rear surface in spaced relation thereto, and a shaft having ends thereof attached to said backing plate and to said blade, said arm being pivotally mounted on said shaft.

8. In combination a vehicle working blade and a working arm mounted thereon said blade comprising first and second side edges and a rear surface, at least a portion of said rear surface being situated in a first plane, said arm including a concave load engaging portion, hydraulic means connecting said arm and said blade for providing movement to said arm relative to said blade, mounting means connecting said arm to said blade for pivotal movement thereof, said mounting means permitting movement of said arm in a second plane, said second plane being parallel to and proximate to said first plane, said concave load engaging portion forming an element of a jaw for gripping loads, said mounting means being positioned in relation to said first side edge of said blade to permit movement of said concave load engaging portion of said arm between positions alongside said rear surface and within the area between said first and second side edges of said blade and positions outside said first side edge of said blade.

9. The combination defined in claim 8 wherein said concave load engaging portion coacts with said first side edge of said blade to form a load gripping jaw.

10. The combination defined in claim 8 wherein said arm is pivotable about an axle which is perpendicular to said first plane, said axis being situated between said first and second sides of said blade.

11. The combination as claimed in claim 1, wherein said mounting means includes a backing plate rigidly mounted on said blade in spaced relation thereto and a shaft supporting said arm between said plate and said-rear surface of said blade.

12. The combination as defined in claim 1 wherein said arm mounting means includes a pivot pin upon which said arm is mounted, said pivot pin being situated at a first position on said back surface of said blade, said hydraulic means comprises piston and cylinder means, said piston and cylinder means having first and second ends, said arm including a piston and cylinder connector means at a first end thereof pivotally connecting said arm to said first end of said piston and cylinder means, pivotal connecting means connecting said second end of said piston and cylinder means to said blade at a second position on said rear surface of said blade, said blade including a top edge and a bottom edge, wherein said second position is closer to said bottom edge of said blade than is said first position.

13. A vehicle in accordance with claim 1 including a second working arm which is substantially a mirror image of the aforesaid working arm and is pivotally mounted on said blade adjacent said second edge thereof, said second arm including a load engaging portion, said load engaging portion of said second arm being positionable outside said second edge of said blade to form a load gripping jaw with said second edge, said load engaging portion of said second arm being movable to a position inside said blade edges and in juxtaposition to said rear surface of said blade.

\* \* \* \* \*

UNITED STATES PATENT AND TRADEMARK OFFICE
CERTIFICATE OF CORRECTION

PATENT NO. : 5,486,085
DATED : January 23, 1996
INVENTOR(S) : Daniel C. Gagne and Arie A. Pronk It is certified that error appears in the above-indentified patent and that said Letters Patent is hereby corrected as shown below:

Column 6, line 15, claim 10:

10. The combination defined in claim 8 wherein said arm is pivotable about an <u>axis</u> which is perpendicular...

Signed and Sealed this

Twenty-seventh Day of August, 1996

Attest:

BRUCE LEHMAN

Attesting Officer

Commissioner of Patents and Trademarks